US006235818B1

(12) United States Patent
Morizono et al.

(10) Patent No.: US 6,235,818 B1
(45) Date of Patent: May 22, 2001

(54) HOT MELT ADHESIVE COMPOSITION CONTAINING α-OLEFIN/AROMATIC VINYL COMPOUND RANDOM COPOLYMER

(75) Inventors: Kenichi Morizono; Keiji Okada; Suguru Tokita, all of Waki-cho (JP)

(73) Assignee: Mitsui Chemicals, Tokyo (JP)

( * ) Notice: Subject to any disclaimer, the term of this patent is extended or adjusted under 35 U.S.C. 154(b) by 0 days.

(21) Appl. No.: 09/355,504

(22) PCT Filed: Jan. 21, 1998

(86) PCT No.: PCT/JP98/00211

§ 371 Date: Jul. 29, 1999

§ 102(e) Date: Jul. 29, 1999

(87) PCT Pub. No.: WO98/33861

PCT Pub. Date: Aug. 6, 1998

(30) Foreign Application Priority Data

Jan. 30, 1997 (JP) .......................................... 9-17110

(51) Int. Cl.[7] .................. C09J 123/08; C09J 125/08; C09J 201/00
(52) U.S. Cl. ..................... 524/77; 524/270; 524/515; 524/578; 524/528; 524/570; 526/935
(58) Field of Search ................ 524/77, 270, 515, 524/578, 528, 570; 526/935

(56) References Cited

FOREIGN PATENT DOCUMENTS

| 0478800 | 4/1992 | (EP) . | |
|---|---|---|---|
| 478 800 | * 4/1992 | (EP) | ............................. C09J/123/18 |
| 0896044 | 2/1999 | (EP) . | |

OTHER PUBLICATIONS

Patent Abstracts of Japan, vol. 1997, No. 10, Oct. 31, 1997 & JP 09 157598 A (Toray Ind Inc), Jun. 17, 1997.

Database WPI, Derwent Publications Ltd., London, GB; AN 1989–204352 XP002139124 & JP 01 144483 A (Mitsui), Jun. 6, 1989, Abstract.

Abstract of Japanese Laid–Open Patent Application Publication No. 3–163088 (Jul. 15, 1991).

* cited by examiner

Primary Examiner—David W. Wu
Assistant Examiner—Kelichi C. Egwim

(57) ABSTRACT

A hot melt adhesive composition exhibiting excellent adhesive strength and which is useful as an adhesive for styrene resins contains (B) tackifier and (C) ethylene/$C_3$–$C_{20}$ α-olefin/aromatic vinyl compound random copolymer and, in some embodiments also (A) base polymer, such as polyolefin, polar group-containing polymer and aromatic vinyl compound/conjugated diene copolymer. A low molecular weight polyolefin may also be included in all embodiments. The randon copolymer (C) may be prepared by polymerizing the α-olefin and aromatic vinyl compound in the presence of a metallocene containing catalyst. In addition to excellent adhesive strength the hot melt adhesives have improved workability.

13 Claims, No Drawings

HOT MELT ADHESIVE COMPOSITION CONTAINING α-OLEFIN/AROMATIC VINYL COMPOUND RANDOM COPOLYMER

CROSS-REFERENCE TO RELATED APPLICATIONS

This application is the Section 371 of International Application PCT/JP98/00211, filed Jan. 21, 1998.

FIELD OF THE INVENTION

The present invention relates to a hot-melt adhesive composition. More particularly, the present invention is concerned with a hot-melt adhesive composition which exhibits excellent adhesive strength and can be used as an adhesive for styrene resins.

BACKGROUND OF THE INVENTION

It is well known that hot-melt adhesives comprising a base of a polymer such as a polyolefin, a polyamide, a polyester, a vinyl acetate copolymer, a cellulose derivative, polymethyl methacrylate, a polyvinyl ether or a polyurethane and, added to the base, a tackifier, exhibit adhesive effect when applied to, for example, a label, a kraft tape or a cloth tape and heated.

In recent years, the fields of application of hot-melt adhesives are rapidly increasing because the hot-melt adhesives are superior to the conventional solvent containing adhesives in the coating speed, safety, working environment and energy saving. Commonly employed hot-melt adhesives comprise a base polymer of EVA or a styrene/conjugated diene block copolymer added to the base polymer, a tackifier and a low-molecular-weight polyolefin. Enhanced performance of adhesives is increasingly demanded in recent years and it is required that adhesives exhibit high adhesive strength to a variety of materials.

For example, specifically, the styrene content of the adhesive based on the styrene/conjugated diene block copolymer is increased for improving the heat resistance of the adhesive. However, the adhesive strength of the resultant adhesive is not satisfactory, and it has been difficult to realize a desirable balance of heat resistance and adhesive property for the adhesive.

OBJECT OF THE INVENTION

The present invention has been made in view of the above state of the prior art. It is an object of the present invention to provide a hot-melt adhesive composition having excellent adhesive strength.

SUMMARY OF THE INVENTION

The first hot-melt adhesive composition of the present invention comprises:

100 parts by weight of a tackifier (B), and
1 to 900 parts by weight of an α-olefin/aromatic vinyl compound random copolymer (C).

The second hot-melt adhesive composition of the present invention comprises:

100 parts by weight of a base polymer (A),
1 to 900 parts by weight of a tackifier (B), and
1 to 1000 parts by weight of an α-olefin/aromatic vinyl compound random copolymer (C).

The third hot-melt adhesive composition of the present invention comprises:

100 parts by weight of a base polymer (A),
10 to 300 parts by weight of a tackifier (B), and 10 to 400 parts by weight of an α-olefin/aromatic vinyl compound random copolymer (C).

In the present invention, the base polymer (A) is, for example, at least one polymer selected from the group consisting of a polyolefin (a-1), a polar group containing polymer (a-2) and an aromatic vinyl compound/conjugated diene copolymer (a-3). Of these, the aromatic vinyl compound/conjugated diene copolymer (a-3) is preferred.

It is preferred in the present invention that the α-olefin/aromatic vinyl compound random copolymer (C) be an ethylene/aromatic vinyl compound random copolymer and that the α-olefin/aromatic vinyl compound random copolymer (C) contain structural units derived from an aromatic vinyl compound in an amount of 1 to 80 mol %.

Further, the second and third hot-melt adhesive compositions of the present invention may comprise a low-molecular-weight polyolefin (D) in an amount of 1 to 100 parts by weight per 100 parts by weight of the base polymer (A) in addition to the base polymer (A), the tackifier (B) and the α-olefin/aromatic vinyl compound random copolymer (C).

The first hot-melt adhesive composition of the present invention may comprise a low-molecular-weight polyolefin having an intrinsic viscosity (η) of 0.01 to 0.6 dl/g (D) in an amount of 1 to 100 parts by weight per 100 parts by weight of the tackifier (B) in addition to the tackifier (B) and the α-olefin/aromatic vinyl compound random copolymer (C).

DETAILED DESCRIPTION OF THE INVENTION

The hot-melt adhesive composition of the present invention will be described in detail below.

The first hot-melt adhesive composition of the present invention comprises a tackifier (B) and an α-olefin/aromatic vinyl compound random copolymer (C) optionally together with a low-molecular-weight polyolefin (D).

Each of the second and third hot-melt adhesive compositions of the present invention comprises a base polymer (A), a tackifier (B) and an α-olefin/aromatic vinyl compound random copolymer (C) optionally together with a low-molecular-weight polyolefin (D).

First, each of the above components (A), (B), (C) and (D) for use in the present invention will be described.

Base Polymer (A)

The base polymer (A) added according to necessity in the present invention is not particularly limited as long as it is a polymer generally employed in common hot-melt adhesives. Examples of suitable base polymers (A) include a polyolefin (a-1), a polar group containing polymer (a-2) and an aromatic vinyl compound/conjugated diene copolymer (a-3)

Polyolefin (a-1)

Examples thereof include:
polyethylenes (HDPE, LDPE, LLDPE, etc.);
polypropylenes (atactic polypropylene, syndiotactic polypropylene, etc.); and
ethylene/propylene copolymers.

Polar Group Containing Polymer (a-2)

Examples thereof include:
(1) ethylene/vinyl acetate copolymer (EVA);
(2) modified EVA polymers such as saponified EVA and graft-modified EVA;
(3) ethylene/(meth)acrylate copolymers such as ethylene/ethyl(meth)acrylate (EEA);

(4) ionomer resins obtained by partially neutralizing ethylene/(meth)acrylic acid copolymer, such as polymer conmercially available by the trade name of Himilan from Mitsui Du Pont Polychemical;

(5) ethylene/propylene/(meth)acrylic acid terpolymers;

(6) polyamides: products obtained by reacting a dibasic acid with a diamine, for example, those obtained by reacting a dimer acid which is a dimer of a fatty acid such as soybean oil, tung oil or tall oil with an alkyldiamine such as ethylenediamine or diethylenetriamine and nylons such as nylon-12, examples thereof including polymers commercially available by the trade name of Diamid (Daicel Chemical Industries, Ltd.), Platilon (Toagosei Chemical Industry Co., Ltd.) and Amilan (Toray Industries, Inc.);

(7) polyesters, for example, those commercially available by the trade name of Ester Resin 200 or 300 (Toyobo Co., Ltd.) and Vitel 200 or 300 (Goodyear Tire & Rubber Co., Ltd.); and (8) vinyl acetate copolymers such as vinyl acetate/crotonic acid copolymer, vinyl acetate/phthalic anhydride copolymer and vinyl acetate/vinylpyrrolidone copolymer, cellulose derivative polymers, polymethyl methacrylate polymers, polyvinyl ether polymers, polyurethane polymers and thermosetting resin polymers.

Aromatic Vinyl Compound/conjugated Diene Copolymer (a-3)

The aromatic vinyl compound/conjugated diene copolymer (a-3) is a copolymer of an aromatic vinyl compound and a conjugated diene compound or a product of hydrogenation thereof. Examples thereof include styrene/butadiene random copolymer, styrene/isoprene random copolymer, butadiene/polystyrene block copolymer, polystyrene/polyisoprene block copolymer, polystyrene/polyisoprene/polystyrene triblock copolymer, polystyrene/polybutadiene/polystyrene triblock copolymer, poly(($\alpha$-methylstyrene)/polybutadiene/poly($\alpha$-methylstyrene) triblock copolymer and products of hydrogenation thereof. These polymers, both unhydrogenated and hydrogenated polymers, are commercially available. For example, such polymers are commercially available by the trade name of Cariflex TR-1101, TR-1107 and TR-4113 (Shell Int. Chem. Co., Ltd.), Kraton G-6500, G-6521, G-1650, G-1652 and G-1657 (Shell Chem. Co., Ltd.) and Solprene and hydrogenated Solprene (Phillips Petroleum Co., Ltd.).

In the present invention, the above base polymers can be used either individually or in combination. Of the above base polymers, the aromatic vinyl compound/conjugated diene copolymer and products of hydrogenation thereof are preferred. The aromatic vinyl compound/conjugated diene copolymer is especially preferred.

Tackifier (B)

The tackifier (B) for use in the present invention is added for regulating the melt viscosity of the base polymer (A) and for improving the hot tack and wetting properties thereof. The tackifier (B) is not particularly limited as long as, when blended with the base polymer (A) and heated, it can improve the hot tack and wetting properties of the base polymer (A).

Examples of suitable tackifiers (B) include alicyclic hydrogenated tackifiers, rosins (unmodified or modified rosin and products of esterification thereof), aliphatic petroleum resins, alicyclic petroleum resins, aromatic petroleum resins, petroleum resins based on a copolymer of aliphatic and aromatic components, low-molecular-weight styrene resin, isoprene resin, alkyl phenolic resin, terpene resins and coumaroneindene resin. These tackifiers (B) can be used either individually or in combination in the present invention.

$\alpha$-olefin/aromatic Vinyl Compound Random Copolymer (C)

The $\alpha$-olefin/aromatic vinyl compound random copolymer (C) for use in the present invention is a random copolymer of an $\alpha$-olefin and an aromatic vinyl compound. The $\alpha$-olefin is, for example, selected from among $\alpha$-olefins having 2 to 20 carbon atoms, such as ethylene, propylene, 1-butene, 3-methyl-1-butene, 4-methyl-1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicodecene. The above $\alpha$-olefins can be used either individually or in combination.

Examples of suitable aromatic vinyl compounds include styrene; mono- or polyalkylstyrenes such as o-methylstyrene, m-methylstyrene, p-methylstyrene, o,p-dimethylstyrene, o-ethylstyrene, m-ethylstyrene and p-ethylstyrene; functional group containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene, 4-phenylbutene and $\alpha$-methylstyrene. Of these, styrene and 4-methoxystyrene are preferred.

The $\alpha$-olefin/aromatic vinyl compound random copolymer (C) comprises 99.9 to 20 mol %, preferably, 99 to 50 mol %, still preferably, 99 to 70 mol % of structural units derived from an $\alpha$-olefin and 0.1 to 80 mol %, preferably, 1 to 50 mol %, still preferably, 1 to 30 mol % of structural units derived from an aromatic vinyl compound. When the content of structural units derived from an aromatic vinyl compound falls outside the above range, the adhesive property is likely to be poor.

It is preferred that the $\alpha$-olefin/aromatic vinyl compound random copolymer (C) for use in the present invention be a random copolymer of ethylene, an aromatic vinyl compound and an ($\alpha$-olefin having 3 to 20 carbon atoms. Examples of suitable $\alpha$-olefins having 3 to 20 carbon atoms include propylene, 1-butene, 3-methyl-1-butene, 4-methyl-1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicodecene. Of these, 1-butene, 1-pentene, 1-hexene and 1-octene are preferred. The above $\alpha$-olefins can be used either individually or in combination.

In the copolymer obtained from ethylene and an aromatic vinyl compound optionally together with an $\alpha$-olefin, the molar ratio of structural units derived from ethylene to structural units derived from an $\alpha$-olefin having 3 to 20 carbon atoms (ethylene/$\alpha$-olefin) generally ranges from 100/0 to 40/60, preferably, 100/0 to 60/40 and, still preferably, 100/0 to 70/30.

When the molar ratio of structural units derived from ethylene to structural units derived from an $\alpha$-olefin having 3 to 20 carbon atoms is in the above range, excellent adhesive property is ensured.

In the copolymerization of the $\alpha$-olefin/aromatic vinyl compound random copolymer, use may be made of another monomer, for example, a nonconjugated diene. Examples of suitable nonconjugated dienes include 1,4-pentadiene, 1,4-hexadiene, 4-methyl-1,5-heptadiene, 5-methylene-2-norbornene, 5-ethylidene-2-norbornene, 5-isopropenyl-2-norbornene, 2,5-norbornadiene, 1,6-cyclooctadiene, 2-ethylene-2,5-norbornadiene, 2-isopropenyl-2,5-norbornadiene, dicyclopentadiene, 1,6-octadiene, 1,7-octadiene, tricyclopentadiene and dihydrodicyclopentadienyloxyethylene and further include esters with unsaturated carboxylic acids such as acrylic acid, methacrylic acid, itaconic acid, maleic acid and fumaric acid. These may be used either individually or in combination.

It is preferred that the above α-olefin/aromatic vinyl compound random copolymer have an intrinsic viscosity (η), as measured in decalin at 135° C., of 0.01 to 10 dl/g. When the intrinsic viscosity (η) is in the range of 0.01 to 0.6 dl/g, the resultant hot-melt adhesive exhibits-satisfactory performance. When the intrinsic viscosity (η) exceeds 0.6 dl/g but is not greater than 10 dl/g, the workability (melt viscosity, stringing prevention) is improved to thereby facilitate handling at the time of adding low-molecular-weight polymers.

In the α-olefin/aromatic vinyl compound random copolymer for use in the present invention, it is preferred from the viewpoint of adhesive strength and handling easiness at the time of hot melting that the ratio of structural units constituting a chain structure in which at least two structural units derived from an aromatic vinyl compound are arranged in sequence be 1% or less, especially, 0.1% or less based on the structural units derived from the aromatic vinyl compound. The content of the chain structure in which at least two structural units derived from an aromatic vinyl compound are arranged in sequence can be determined by $^{13}$C-NMR.

When the α-olefin/aromatic vinyl compound random copolymer is an ethylene/aromatic vinyl compound random copolymer, it is preferred that the B value determined by the $^{13}$C-NMR spectrum thereof and the following formula range from 0.80 to 2.00, especially, from 0.85 to 1.50, still especially, from 0.95 to 1.45 and, further still especially, from 1.00 to 1.40.

$$B \text{ value} = (P_{SE})/(2-(P_E)-(P_S))$$

wherein $(P_E)$ represents the content, in terms of molar fraction, of structural units derived from ethylene (ethylene units) in the ethylene/aromatic vinyl compound random copolymer, $(P_S)$ represents the content, in terms of molar fraction, of structural units derived from the aromatic vinyl compound (aromatic vinyl compound units) in the ethylene/aromatic vinyl compound random copolymer, and $(P_{SE})$ represents the ratio of the number of aromatic vinyl compound unit/ethylene unit chains to the total number of dyad chains in the ethylene/aromatic vinyl compound random copolymer.

The B value determined by the above formula is an index indicating the state of distribution of ethylene units and aromatic vinyl compound units in the copolymer. The B value can be determined with reference to the reports of J. C. Randall (Macromolecules, 15, 353 (1982)) and J. Ray (Macromolecules, 10, 773 (1977)). The greater the above B value, the shorter the blocked chains of ethylene units or aromatic vinyl compound units, thereby indicating that the distribution of ethylene units and aromatic vinyl compound units is uniform. On the other hand, the smaller than 1.00 the B value, the more nonuniform the distribution of ethylene/aromatic vinyl compound random copolymer, thereby indicating that the blocked chains are lengthened.

A process for producing the α-olefin/aromatic vinyl compound random copolymer will now be described.

The α-olefin/aromatic vinyl compound random copolymer for use in the present invention can be produced by copolymerizing ethylene and an aromatic vinyl compound optionally together with an α-olefin having 3 to 20 carbon atoms, for example, in the presence of a metallocene catalyst (a).

Any of metallocene catalysts having been commonly used as a single site catalyst and metallocene catalyst similar thereto can be used as the above metallocene catalyst (a) without any restriction. In particular, preferred use is made of a catalyst composed of a metallocene compound of transition metal (transition metal compound) (b), an organoaluminum oxy compound (c) and/or an ionizing ionic compound (d).

Examples of suitable metallocene compounds (b) include metallocene compounds of transition metals selected from among the elements of Group IV of the periodic table (long period type) as indicated by group numbers 1 to 18 of revised issue (1989) of the IUPAC Inorganic Chemistry Nomenclature, in particular, metallocene compounds represented by the following general formula:

$$MLx \quad (1)$$

wherein M represents a transition metal selected from among the elements of Group IV of the periodic table, for example, zirconium, titanium or hafnium, and x is the valence of the transition metal.

In the formula (1), L's represent ligands which coordinate with the transition metal. Out of these, at least one ligand L has a cyclopentadienyl skeleton. The ligand having a cyclopentadienyl skeleton Tmay have substituents.

Examples of suitable ligands having a cyclopentadienyl skeleton include a cyclopentadienyl group; alkyl- or cycloalkyl-substituted cyclopentadienyl groups such as a methylcyclopentadienyl group, an ethylcyclopentadienyl group, an n- or i-propylcyclopentadienyl group, an n-, i-, sec- or t-butylcyclopentadienyl group, a hexylcyclopentaqdienyl group, an octylcyclopentadienyl group, a dimethylcyclopentadienyl group, a trimethylcyclopentadienyl group, a tetramethylcyclopentadienyl group, a pentamethylcyclopentadienyl group, a methylethylcyclopentadienyl group, a methylpropylcyclopentadienyl group, a methylbutylcyclopentadienyl group, a methylhexylcyclopentadienyl group, a methylbenzylcyclopentadienyl group, an ethylbutylcyclopentadienyl group, an ethylhexylcyclopentadienyl group and a methylcyclohexylcyclopentadienyl group; and an indenyl group, a 4,5,6,7-tetrahydroindenyl group and a fluorenyl group.

These groups may be substituted with halogen atoms, trialkylsilyl groups and other groups.

Of these groups, alkyl-substituted cyclopentadienyl groups are preferred.

When the metallocene compound (b) of the formula (1) has at least two cyclopentadienyl skeleton having groups as ligands L, two of the cyclopentadienyl skeleton having groups may be bonded with each other through an alkylene group such as ethylene or propylene, a substituted alkylene group such as isopropylidene or diphenylmethylene, a silylene group or a substituted silylene group such as dimethylsilylene, diphenylsilylene or methylphenylsilylene.

Examples of other L's than the cyclopentadienyl skeleton having ligand include a hydrocarbon group having 1 to 12 carbon atoms, an alkoxy group, an aryloxy group, a sulfonic acid containing group of the formula —SO$_3$R$^1$ (wherein R$^1$ represents an alkyl group, an alkyl group substituted with a halogen atom, an aryl group or an aryl group substituted with a halogen atom or an alkyl group), a halogen atom and a hydrogen atom.

Examples of suitable hydrocarbon groups having 1 to 12 carbon atoms include an alkyl group, a cycloalkyl group, an aryl group and an aralkyl group. Specificaly, examples of suitable hydrocarbon groups include:

an alkyl group such as methyl, ethyl, n-propyl, isopropyl, n-butyl, isobutyl, sec-butyl, t-butyl, pentyl, hexyl, octyl, decyl or dodecyl;

a cycloalkyl group such as cyclopentyl or cyclohexyl;

an aryl group such as phenyl or tolyl; and an aralkyl group such as benzyl or neophyl.

Examples of suitable alkoxy groups include methoxy, ethoxy, n-propoxy, isopropoxy, n-butoxy, isobutoxy, sec-butoxy, t-butoxy, pentoxy, hexoxy and octoxy.

Examples of suitable aryloxy groups include phenoxy.

Examples of suitable sulfonic acid containing groups of the formula —$SO_3R^1$ include methanesulfonate, p-toluenesulfonate, trifluoromethanesulfonate and p-chlorobenzenesulfonate.

Examples of suitable halogen atoms include fluorine, chlorine, bromine and iodine.

When the valence of the transition metal is, for example, 4, the metallocene compound (b) of the formula (1) can specifically be represented by the general formula:

$$R^2_k R^3_l R^4_m R^5_n M \qquad (2)$$

wherein M represents a transition metal, preferably, zirconium or titanium as in the formula (1); $R^2$ represents a cyclopentadienyl skeleton having group (ligand); $R^3$, $R^4$ and $R^5$ may be identical with or different from each other and are cyclopentadienyl skeleton having groups or the same as other L's than the cyclopentadienyl skeleton having ligands used in the formula (1); and k is an integer of 1 or greater and satisfies the relationship k+l+m+n=4.

In the present invention, the metallocene compound (b) can be one represented by the general formula:

$$L^1 M^2 Z^1_2 \qquad (3)$$

wherein:

$M^2$ represents a metal of Group IV or lanthanides series of the periodic table;

$L^1$ represents a derivative of delocalized n-bond group and imparts a constrained geometric configuration to active sites of metal $M^2$; and $Z^1$s may be identical with or different from each other and represents a hydrogen atom, a halogen atom or any of a hydrocarbon group, a silyl group and a germyl group which contain up to 20 carbon atoms, a silicon atom- .and a germanium atom, respectively.

Of the above metallocene compounds (b) of the formula (3), preferred use is made of the metallocene compound represented by the general formula:

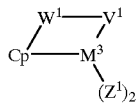

(4)

In the above formula (4), $M^3$ represents titanium, zirconium or hafnium, and $Z^1$ is as defined above.

Cp represents an unsubstituted or a substituted cyclopentadienyl group or a derivative thereof, which is π-bonded in $\eta 0^5$ bonding form to $M^3$.

$W^1$ represents oxygen, sulfur, boron, an element of Group 14 of the periodic table or a group containing any of these elements.

$V^1$ represents a ligand containing nitrogen, phosphorus, oxygen or sulfur.

$W^1$ and $V^1$ may form a condensed ring, and Cp and $W^1$ may form a condensed ring.

Preferred examples of groups represented by Cp of the general formula (4) include a cyclopentadienyl group, an indenyl group, a fluorenyl group and saturated derivatives thereof. These form rings in cooperation With metal atom ($M^3$). Each carbon atom in the cyclopentadienyl group may be substituted or unsubstituted with the same or a different group selected from the group consisting of hydrocarbyl groups, substituted-hydrocarbyl groups wherein one or more hydrogen atoms is replaced by a halogen atom, hydrocarbyl substituted metalloid groups wherein the metalloid is selected from Group 14 of the Periodic Table of the Elements, and the halogen groups. Two or a plurality of such substituents in combination may form a fused ring system. Preferred unsubstituted or substituted hydrocarbyl groups capable of substituting at least one hydrogen atom in the cyclopentadienyl group each contain 1 to 20 carbon atoms and include linear or branched alkyl groups, cyclic hydrocarbon groups, alkyl substituted cyclic hydrocarbon groups, aromatic groups and alkyl substituted aromatic groups. Examples of preferred organometalloid groups include mono-, di- and tri-substituted organometalloid groups of the elements of Group 14. Each of the hydrocarbyl groups contains 1 to 20 carbon atoms. Specific examples of preferred organometalloid groups include trimethylsilyl, triethylsilyl, ethyldimethylsilyl, methyldiethylsilyl, phenyldimethylsilyl, methyldiphenylsilyl, triphenylsilyl, triphenylgermyl and trimethylgermyl.

$Z^1$s of the general formula (4) each represent, for example, a hydride, a halo, an alkyl, a silyl, a germyl, an aryl, an amide, an aryloxy, an alkoxy, a phosphide, a sulfide, an acyl, a pseudohalide such as a cyanide or an azide, an acetylacetonate or a mixture thereof, which may be either identical with or different from each other.

Examples of the compounds represented by the general formula (4) include:

(dimethyl(t-butylamido)(tetramethyl-$\eta^5$-cyclopentadienyl) silane)titanium dichloride; and ((t-butylamido) (tetramethyl-$\eta^5$-cyclopentadienyl)-1,2-ethanediyl)titanium dichloride.

Among the various metallocene compounds (b), the metallocene compound represented by the general formula (3) is especially preferred from the viewpoint of polymerization activity and the transparency, rigidity, heat resistance and impact resistance of molded item. The above described metallocene compounds (b) may be used either individually or in combination.

Each of the metallocene compounds (b) for use in the present invention may be diluted with a hydrocarbon or a halogenated hydrocarbon prior to use.

The organoaluminum oxy compound (c) and ionizing ionic compound (d) for use in the formation of the metallocene catalyst (a) will be described below.

The organoaluminum oxy compound (c) for use in the present invention may be conventional aluminooxane (c) or benzene-insoluble organoaluminum oxy compounds (c) set forth by way of example in Japanese Patent Laid-open Publication No. 2(1990)-78687.

The aluminooxane (c) is produced, for example, by the following methods and is generally recovered as a solution in a hydrocarbon solvent:

method (1) in which an organoaluminum compound such as a trialkylaluminum is added to an aromatic hydrocarbon solvent in which an adsorbed water containing compound or crystal water containing salt such as magnesium chloride hydrate, copper sulfate hydrate, aluminum sulfate hydrate, nickel sulfate hydrate or cerium (I) chloride hydrate is suspended and reacted, and the product is recovered as a solution in the aromatic hydrocarbon solvent;

method (2) in which water (liquid water, ice or steam) directly acts on an organoaluminum compound such as a trialkylaluminum in a solvent such as benzene, toluene, ethyl ether or tetrahydrofuran, and the product is recovered as a solution in an aromatic hydrocarbon solvent; and method (3) in which an organotin oxide such as dimethyltin oxide or dibutyltin oxide reacts with an organoaluminum compound such as a trialkylaluminum in a hydrocarbon solvent such as decane, benzene or toluene.

Examples of suitable ionizing ionic compounds (d) include Lewis acids, ionic compounds, borane compounds and carborane compounds. These ionizing ionic compounds (d) are described in Published Japanese Translation of PCT Patent Applications from Other States, Nos. 1(1989)-501950 and 1(1989)-502036, Japanese Patent Laid-open Publication Nos. 3(1991)-179005, 3(1991)-179006, 3(1991)-207703 and 3(1991)-207704 and U.S. Pat. No. 5,321,106.

The Lewis acid used as ionizing ionic compound (d) is, for example, any of compounds represented by the formula $BR_3$ (wherein R's may be identical with or different from each other and represent fluorine atoms or phenyl groups unsubstituted or substituted with a fluorine atom, a methyl group, a trifluoromethyl group or the like). Examples of suitable Lewis acids include trifluoroboron, triphenylboron, tris(4-fluorophenyl)boron, tris(3,5-difluorophenyl)boron, tris(4-fluoromethylphenyl)boron and tris(pentafluorophenyl)boron.

The ionic compound used as ionizing ionic compound (d) is a salt consisting of a cationic compound (cation) and an anionic compound (anion). The anionic compound reacts with the above metallocene compound (b) to thereby cationize the metallocene compound (b) and thus form an ion pair, so that the anionic compound acts to stabilize transition metal cation species. Examples of suitable anions include organoboron compound anions, organoarsenic compound anions and organoaluminum compound anions. Of these, relatively bulky anions capable of stabilizing transition metal cation species are preferred. Examples of suitable cations include metal cations, organometal cations, carbonium cations, tritium cations, oxonium cations, sulfonium cations, phosphonium cations and ammonium cations. Specifically, suitable cations include triphenylcarbenium cation, tributylammonium cation, N,N-dimethylammonium cation and ferrocenium cation.

Of the above compounds, ionic compounds containing a boron compound are preferably used as the anionic compound, which include, for example, trialkylsubstituted ammonium salts, N,N-dialkylanilinium salts, dialkylammonium salts and triarylphosphonium salts.

Examples of the above trialkyl-substituted ammonium salts include triethylammonium tetra(phenyl)boride, tripropylammonium tetra(phenyl)boride, tri(n-butyl) ammonium tetra(phenyl)boride and trimethylammonium tetra(p-tolyl)boride.

Examples of the above N,N-dialkylanilinium salts include N,N-dimethylanilinium tetra(phenyl)boride.

Examples of the above dialkylammonium salts include di(n-propyl)ammonium tetra(pentafluorophenyl)boride and dicyclohexylammonium tetra(phenyl)boride.

Examples of the above triarylphosphonium salts include triphenylphosphonium tetra(phenyl)boride, tri(methylphenyl) phosphonium tetra(phenyl)boride and tri(dimethylphenyl) phosphonium tetra(phenyl)boride.

Moreover, triphenylcarbenium tetrakis(pentafluorophenyl)borate, N,N-dimethylanilinium tetrakis(pentafluorophenyl) borate, ferrocenium tetra (pentafluorophenyl) borate and the like can be mentioned as the above ionic compounds.

Examples of the borane compounds used as ionizing ionic compound (d) include:

decaborane (14);

anion salts such as bis(tri(n-butyl)a monium) nonaborate and bis(tri(n-butyl)ammonium) decaborate; and metal borane anion salts such as tri(n-butyl)ammonium bis(dodecahydridedodecaborate) cobalt acid salt (III) and bis(tri(n-butyl)ammonium) bis(dodecahydridedodecaborate) nickel acid salt (III).

Examples of the carborane compounds used as ionizing ionic compound (d) include:

anion salts such as 4-carbanonaborane (14) and 1,3-dicarbanonaborane (13); and metal carborane anion salts such as tri(n-butyl) ammonium bis(nonahydride-1,3-dicarbanonaborate) cobalt acid salt (III) and tri(n-butyl)ammonium bis (undecahydride-7,8-dicarbaundecaborate) iron acid salt (III).

The above ionizing ionic compounds (d) may be used in combination.

The metallocene catalyst (a) for use in the present invention may contain the following organoaluminum compound (e) in addition to the above components, according to necessity.

The organoaluminum compound (e) employed according to necessity is, for example, the organoaluminum compound represented by the general formula:

In the formula (5), $R^6$ represents a hydrocarbon group having 1 to 15, preferably, 1 to 4 carbon atoms; X represents a halogen atom or a hydrogen atom; and n is 1 to 3.

Examples of suitable hydrocarbon groups each having 1 to 15 carbon atoms include alkyl groups, cycloalkyl groups and aryl groups. Specifically, use is made of, for example, a methyl, an ethyl, an n-propyl, an isopropyl or an isobutyl group.

Examples of suitable organoaluminum compounds include:

trialkylaluminums such as trimethylaluminum, triethylaluminum, triisopropylaluminum, tri-n-butylaluminum, triisobutylaluminum and tri-sec-butylaluminum;

alkenylaluminums such as isoprenylaluminum, represented by the general formula:

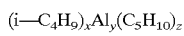

wherein x, y and z are positive numbers, and z and x satisfy the relationship $z \geq 2x$;

dialkylaluminum halides such as dimethylaluminum chloride and diisobutylaluminum chloride;

dialkylaluminum hydrides such as diisobutylaluminum hydride;

dialkylaluminum alkoxides such as dimethylaluminum methoxide; and dialkylaluminum aryloxides such as diethylaluminum phenoxide.

The copolymerization of ethylene and the aromatic vinyl compound optionally together with the α-olefin having 3 to 20 carbon atoms may be conducted by either the batch process or the continuous process. When the copolymerization is conducted by the continuous process, the metallocene catalyst (a) is used in the following concentration.

That is, the concentration of metallocene compound (b) in the polymerization system generally ranges from 0.00005 to 1.0 mmol/lit., preferably, 0.0001 to 0.5 mmol/lit. (polymerization volume).

The organoaluminum oxy compound (c) is fed in an amount of 0.1 to 10,000, preferably, 1 to 5,000 in terms of the ratio of aluminum atoms to transition metal in metallocene compound (b) (Al/transition metal) in the polymerization system.

The ionizing ionic compound (d) is fed in an amount of 0.1 to 20, preferably, 1 to 10 in terms of the molar ratio of ionizing ionic compound (d) to metallocene compound (b) in the polymerization system (ionizing ionic compound (d)/metallocene compound (b)).

When the organoaluminum compound (e) is used, it is generally fed in an amount of about 0 to 5 mmol/lit., preferably, about 0 to 2 mmol/lit. (polymerization volume).

The copolymerization reaction for producing the α-olefin/aromatic vinyl compound random copolymer is generally conducted at a temperature of −30 to 250° C., preferably, 0 to 200° C. under a pressure of 0 to 80 kg/cm$^2$, preferably, 0 to 50 kg/cm$^2$ (gauge pressure).

Although depending on the catalyst concentration, polymerization temperature and other conditions, the reaction time (average residence time when the copolymerization is carried out by the continuous process) generally ranges from 5 min to 3 hr, preferably, from 10 min to 1.5 hr.

In the production of the α-olefin/aromatic vinyl compound random copolymer, ethylene and the aromatic vinyl compound optionally together with the α-olefin having 3 to 20 carbon atoms are fed to the polymerization system in such amounts that the copolymer with the above specified compositions can be obtained. Further, a molecular weight regulator such as hydrogen can be employed in the copolymerization.

When ethylene and the aromatic vinyl compound optionally together with the α-olefin having 3 to 20 carbon atoms are copolymerized in the above manner, the α-olefin/aromatic vinyl compound random copolymer is obtained as a polymer solution containing the same. The polymer solution is processed according to the customary procedure. Thus, there is obtained the α-olefin/aromatic vinyl compound random copolymer.

A graft copolymerization of a monoolefindicarboxylic acid or an anhydride thereof may be conducted on the above α-olefin/aromatic vinyl compound random copolymer (C). Examples of suitable monoolefindicarboxylic acids and anhydrides thereof include dicarboxylic acids such as maleic acid, fumaric acid, itaconic acid, crotonic acid, isocrotonic acid, citraconic acid, acrylsuccinic acid, mesaconic acid, glutaconic acid, Nadic acid (endocisbicyclo(2.2.1)hept-2-ene-5,6-dicarboxylic acid), methyl Nadic acid, tetrahydrophthalic acid and methylhexahydrophthalic acid; and anhydrides such as allylsuccinic anhydride, glutaconic anhydride, Nadic anhydride and tetrahydrophthalic anhydride. At least one of these may be contained in the form of graft units in the graft-modified α-olefin/aromatic compound random copolymer.

It is preferred that the degree of graft modification by the monoolefindicarboxylic acid or anhydride thereof range from 0.1 to 20% by weight, especially, 0.5 to 10% by weight from the viewpoint that a hot-melt adhesive improved in stringing prevention and having excellent workability can be obtained from the graftmodified α-olefin/aromatic vinyl compound random copolymer. Herein, the graft modification degree means the ratio of graft copolymerized monomer to backbone polymer on which a graft copolymerization is carried out. For example, when 1 g of monomer is graft copolymerized on 100 g of the backbone polymer, the graft modification degree is 1% by weight.

The graft modification of the α-olefin/aromatic vinyl compound random copolymer can be conducted by the customary method (for example, the method described in Japanese Patent Publication No. 52(1977)-22988). For example, the graft modification can be carried out by the method comprising heating the (α-olefin/aromatic vinyl compound random copolymer at temperature higher than the softening point to thereby melt the same and slowly dropping thereto the monoolefindicarboxylic acid or anhydride thereof and a peroxide simultaneously under agitation to thereby carry out a graft copolymerization.

Low-molecular-weight Polyolefin (D)

Examples of suitable low-molecular-weight polyolefins (D) added according to necessity in the present invention include:

(i) a polyolefin having an intrinsic viscosity (η) of 0.01 to 0.6 dl/g which is a homopolymer of one of α-olefins having 2 to 12 carbon atoms or a copolymer of at least two thereof; and (ii) a saturated linear or saturated branched hydrocarbon whose intrinsic viscosity (η) ranges from 0.01 to 0.6 dl/g.

With respect to the polyolefin (i), examples of suitable α-olefins having 2 to 12 carbon atoms include ethylene, propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, dimethyl-1-hexene, trimethyl-1-pentene, ethyl-1-hexene, methylethyl-1-pentene, diethyl-1-butene, propyl-1-pentene, 1-decene, methyl-1-nonene, dimethyl-1-octene, trimethyl-1-heptene, ethyl-1-octene, methylethyl-1-heptene, diethyl-1-hexene and 1-dodecene.

The polyolefin (i) can be produced by various conventional methods. Examples thereof include the method employing a high pressure radical polymerization or a low or medium pressure polymerization conducted in the presence of various transition metal compound catalysts such as Ziegler catalyst and the thermal decomposition method in which, after the formation of a high-molecular-weight homopolymer or copolymer by the above polymerization method, the molecular weight of the high-molecular-weight homopolymer or copolymer is reduced by the thermal degradation technique or the radical degradation technique using a peroxide.

Examples of suitable hydrocarbons (ii) include linear hydrocarbons (e.g., paraffin wax and Sasol wax) and branched hydrocarbons (e.g., microwax). These waxes are publicly known and commercially available.

For example, Sasol wax can be produced by the following process.

For example, coal is gasified by the use of steam and oxygen to thereby obtain a synthetic gas composed mainly of carbon monoxide and hydrogen. This synthetic gas is passed through a fixed bed catalyst reactor in accordance with the process known as "ARGE process". Out of the thus obtained reaction product, the fraction heavier than diesel engine oil is separated into the first fraction (components of $C_{18}$ to $C_{23}$), the second fraction (components of $C_{22}$ to $C_{36}$) and the third fraction (components of $C_{33}$ and higher) by vacuum distillation. The third fraction is hydrogenated and all unsaturated hydrocarbons and oxygen compounds are removed. Thus, Sasol wax is obtained.

Hot-melt Adhesive Composition

The first hot-melt adhesive composition of the present invention comprises the above tackifier (B) and α-olefin/aromatic vinyl compound random copolymer (C). Specifically, the first hot-melt adhesive composition comprises:

100 parts by weight of the tackifier (B), and 1 to 900 parts by weight, preferably, 1 to 700 parts by weight of the α-olefin/aromatic vinyl compound random copolymer (C).

The second hot-melt adhesive composition of the present invention comprises the above base polymer (A), tackifier (B) and α-olefin/aromatic vinyl compound random copolymer (C). Specifically, the second hot-melt adhesive composition comprises:

100 parts by weight of the base polymer (A), 1 to 900 parts by weight, preferably, 1 to 700 parts by weight of the tackifier (B), and 1 to 1,000 parts by weight, preferably, 1 to 800 parts by weight of the α-olefin/aromatic vinyl compound random copolymer (C).

That is, the second hot-melt adhesive composition contains more than 0 to 10,000 parts by weight, preferably, 15 to 10,000 parts by weight of the base polymer (A) and 0.1 to 100,000 parts by weight, preferably, 0.1 to 80,000 parts by weight of the α-olefin/aromatic vinyl compound random copolymer (C) per 100 parts by weight of the tackifier (B).

The third hot-melt adhesive composition of the present invention comprises the above base polymer (A), tackifier (B) and α-olefin/aromatic vinyl compound random copolymer (C). Specifically, the third hot-melt adhesive composition comprises:

100 parts by weight of the base polymer (A), 10 to 300 parts by weight, preferably, 50 to 200 parts by weight of the tackifier (B), and 10 to 400 parts by weight, preferably, 30 to 300 parts by weight of the α-olefin/aromatic vinyl compound random copolymer (C).

Low-molecular-weight polyolefin (D) can be blended into the first hot-melt adhesive composition of the present invention in an amount of 1 to 100 parts by weight, preferably, 10 to 80 parts by weight per 100 parts by weight of the tackifier (B).

Low-molecular-weight polyolefin (D) can be blended into the second hot-melt adhesive composition of the present invention in an amount of 1 to 100 parts by weight, preferably, 10 to 80 parts by weight per 100 parts by weight of the base polymer (A).

Low-molecular-weight polyolefin (D) can be blended into the third hot-melt adhesive composition of the present invention in an amount of 1 to 100 parts by weight, preferably, 10 to 80 parts by weight per 100 parts by weight of the base polymer (A). In any of the first, second and third hot-melt adhesive compositions, the blending of low-molecular-weight polyolefin (D) lowers the melt viscosity of the hot-melt adhesive composition to thereby enable further enhancing the workability of the hot-melt adhesive composition. When the low-molecular-weight polyolefin (D) is blended, it is preferred that the intrinsic viscosity (η) of the α-olefin/aromatic vinyl compound random copolymer be greater than 0.6 dl/g but not greater than 10 dl/g.

In addition to the above base polymer (A), tackifier(B), α-olefin/aromatic vinyl compound random copolymer (C) and low-molecular-weight polyolefin (D), according to necessity, various additives such as a softener, a stabilizer, a filler and an antioxidant can be blended into the hot-melt adhesive composition of the present invention in amounts not detrimental to the object of the present invention.

The second and third hot-melt adhesive compositions of the present invention can be produced by the common process. For example, the above base polymer (A), tackifier(B) and α-olefin/aromatic vinyl compound random copolymer (C) optionally together with the-low-molecular-weight polyolefin (D) and various additives are fed into a blender such as Brabender Plastograph in given proportions, heated and melt kneaded, and shaped into desired configuration, e.g., granules, flakes or rods. The first hot-melt adhesive composition of the present invention can also be produced by the same process using the tackifier (B) and α-olefin/aromatic vinyl compound random copolymer (C).

The hot-melt adhesive composition of the present invention is heated, melted and applied, according to the customary procedure, onto a material to be coated, such as cloth, kraft paper, aluminum foil or other metal foil, polyester film or other resin molding to thereby form an adhesive layer on the material prior to use.

The hot-melt adhesive composition of the present invention exhibits excellent adhesive properties even when it is used in bonding a styrene polymer with a polyolefin.

EFFECT OF THE INVENTION

The hot-melt adhesive composition of the present invention exhibits excellent workability and high adhesive strength.

EXAMPLE

The present invention will now be further illustrated with reference to the following Examples, which in no way limit the scope of the invention.

Production Example 1
Production of Ethylene/styrene Random Copolymer

A 1 lit. glass reactor equipped with a condenser and an agitator was satisfactorily purged with nitrogen, charged with 494 ml of toluene and 6 ml of styrene and saturated with ethylene under agitation. Subsequently, the system interior was heated to 35° C., and 4.5 mmol of methylaluminooxane (produced by Tosoh Akzo, 10% by weight toluene solution) and 0.045 mmol of (t-butyl-amido) dimethyl (tetramethyl-$\eta^5$-cyclopentadienyl)silane-titanium dichloride (0.01 mmol toluene solution) were added to the mixture. A polymerization was conducted at 40° C. for 60 min while continuously feeding ethylene at a rate of 100 Nlit./hr. After the completion of the polymerization, 250 ml of isobutyl alcohol and 10 ml of aqueous hydrochloric acid were added to the mixture and heated at 80° C. for 30 min under agitation. The obtained reaction mixture containing isobutyl alcohol was transferred to a separating funnel, washed with 250 ml of water twice and separated into an oil phase and a water phase. The oil phase was poured into 3 lit. of methanol to thereby precipitate a polymer. The precipitated and separated polymer was dried in vacuum at 130° C. for 12 hr, thereby obtaining an ethylene/styrene random copolymer (hereinafter referred to as "ESC-1"). The molar ratio of ESC-1 constituting ethylene units to styrene units (ethylene units/styrene units) was 97/3, and the ESC-1 exhibited an intrinsic viscosity (7) of 1.6 dl/g as measured in decalin at 135° C.

Production Example 2
Production of Ethylene/styrene Random Copolymer 20 g of ESC-1 obtained in Production Example 1 was placed in a 50 ml pyrex tube and the interior thereof was satisfactorily purged with nitrogen. The pyrex tube was mounted on an aluminum block heater heated at 380° C. and the heating was continued in a nitrogen atmosphere for a period of 60 min started 5 min after the mounting of the pyrex tube. Thereafter, a natural cooling was performed, thereby obtaining a waxy ethylene/styrene random copolymer (hereinafter referred to as "ESC-2"). The molar ratio of ESC-2 constituting ethylene units to styrene units (ethylene units/styrene units) was 97/3, and the ESC-2 exhibited an intrinsic viscosity (η) of 0.2 dl/g as measured in decalin at 135° C. The yield was 99.2%.

Production Example 3
Production of Ethylene/styrene Random Copolymer

An ethylene/styrene random copolymer (ESC-3) was obtained in the same manner as in Production Example 1 except that isopropylidene-bis(indenyl)zirconium dichloride synthesized by the conventional process was used in place of (t-butylamido)dimethyl(tetramethyl-$\eta^5$-cyclopentadienyl) silanetitanium dichloride. The molar ratio of ESC-3 constituting ethylene units to styrene units (ethylene units/styrene units) was 96/4, and the ESC-3 exhibited an intrinsic viscosity (η) of 1.3 dl/g as measured in decalin at 135° C.

Production Example 4
Production of Ethylene/styrene Random Copolymer

The same procedure as in Production Example 2 was repeated except that the copolymer (ESC-3) produced in Production Example 3 was used as the copolymer. Thus, there was obtained an ethylene/styrene random copolymer (hereinafter referred to as "ESC-4"). The molar ratio of ESC-4 constituting ethylene units to styrene units (ethylene units/styrene units) was 96/4, and the ESC-4 exhibited an intrinsic viscosity (η) of 0.2 dl/g as measured in decalin at 135° C.

Production Example 5
Production of Ethylene/styrene Random Copolymer

An ethylene/styrene random copolymer (hereinafter referred to as "ESC-5") was produced in the same manner as in Production Example 1 except that the amounts of toluene and styrene were changed to 485 ml and 15 ml, respectively. The molar ratio of ESC-5 constituting ethylene units to styrene units (ethylene units/styrene units) was 88/12, and the ESC-5 exhibited an intrinsic viscosity (η) of 1.5 dl/g as measured in decalin at 135° C.

Example 1

25 g of styrene/ethylene/butylene/styrene block copolymer (trade name: Kraton G1657, produced by Shell Chem. Co., Ltd., hereinafter referred to as "SEBS"), 15 g of ESC-1 obtained in Production Example 1, 40 g of aliphatic petroleum resin (trade name: Hi-rez T-500X, produced by Mitsui Petrochemical Industries, Ltd., hereinafter referred to as "petroleum resin H") and 20 g of Sasol wax (trade name: Sasol HI imported by S. Kato & Company) as a low-molecular-weight polyolefin were melt kneaded at 180° C., thereby obtaining a hot-melt adhesive composition.

The obtained hot-melt adhesive composition was applied onto aluminum foils (50 μm) each in a thickness of 15 μm, and coating surfaces were attached to each other. Heat sealing was performed by a heat sealing machine under conditions such that the upper bar temperature, the lower bar temperature, the application pressure and the pressurization time were 170° C., 70° C., 1 kg/cm² and 2 sec, respectively, thereby obtaining a laminate sheet. This laminate sheet was cut into specimens each with a width of 25 mm. A 180° peeling test was conducted by means of a tensile tester at a pulling rate of 300 mm/sec to thereby measure an adhesive strength.

The results are given in Table 1.

Comparative Example 1

The same procedure as in Example 1 was repeated except that the amount of SEBS was changed to 40 g and no use was made of ESC-1.

The results are given in Table 1.

Example 2

The same procedure as in Example 1 was repeated except that aliphatic petroleum resin (trade name: Petrosin, produced by Mitsui Petrochemical Industries, Ltd., hereinafter referred to as "petroleum resin P") was used in place of the petroleum resin H.

The results are given in Table 1.

Comparative Example 2

The same procedure as in Comparative Example 1 was repeated except that the petroleum resin P was used in place of the pentene-based aliphatic petroleum resin.

The results are given in Table 1.

Example 3

The same procedure as in Example 1 was repeated except that 40 g of SEBS, 40 g of petroleum resin H and 20 g of ESC-2 were employed as the composition components.

The results are given in Table 1.

Example 4

The same procedure as in Example 1 was repeated except that 40 g of SEBS, 40 g of petroleum resin P and 20 g of ESC-2 were employed as the composition components.

The results are given in Table 1.

Example 5

The same procedure as in Example 1 was repeated except that the copolymer ESC-3 produced in Production Example 3 was used as the copolymer component.

The results are given in Table 1.

Example 6

The same procedure as in Example 3 was repeated except that the copolymer ESC-4 produced in Production Example 4 was used as the copolymer component.

The results are given in Table 1.

TABLE 1

| | Formulation of hot-melt adhesive composition (g) | | Adhesive strength (N/25 mm) | | |
|---|---|---|---|---|---|
| | | | 0° C. | 20° C. | 40° C. |
| Ex. 1 | SEBS | 25 | 5.1 | 9.0 | 14.2 |
| | Petroleum resin-H | 40 | | | |
| | ESC-1 | 15 | | | |
| | Sasol wax | 20 | | | |
| Com. Ex. 1 | SEBS | 40 | 3.3 | 4.0 | 10.7 |
| | Petroleum resin-H | 40 | | | |
| | Sasol wax | 20 | | | |

TABLE 1-continued

| | Formulation of hot-melt adhesive composition (g) | | Adhesive strength (N/25 mm) | | |
|---|---|---|---|---|---|
| | | | 0° C. | 20° C. | 40° C. |
| Ex. 2 | SEBS | 25 | 4.8 | 8.8 | 13.0 |
| | Petroleum resin-P | 40 | | | |
| | ESC-1 | 15 | | | |
| | Sasol wax | 20 | | | |
| Com. Ex. 2 | SEBS | 40 | 2.5 | 3.5 | 10.1 |
| | Petroleum resin-P | 40 | | | |
| | Sasol wax | 20 | | | |
| Ex. 3 | SEBS | 40 | 4.6 | 8.0 | 12.3 |
| | Petroleum resin-H | 40 | | | |
| | ESC-2 | 20 | | | |
| Ex. 4 | SEBS | 40 | 4.0 | 7.1 | 11.8 |
| | Petroleum resin-P | 40 | | | |
| | ESC-2 | 20 | | | |
| Ex. 5 | SEBS | 25 | 4.8 | 8.8 | 13..5 |
| | Petroleum resin-H | 40 | | | |
| | ESC-3 | 15 | | | |
| | Sasol wax | 20 | | | |
| Ex. 6 | SEBS | 40 | 4.1 | 7.5 | 11.5 |
| | Petroleum resin-H | 40 | | | |
| | ESC-4 | 20 | | | |

Example 7

40 g of copolymer ESC-5 obtained in Production Example 5 and 80 g of C9 hydrogenated petroleum resin (trade name: Arkon P-100, produced by Arakawa Chemicals, INC.) were melt kneaded, thereby obtaining a hot-melt adhesive composition. This hot-melt adhesive composition was formed into a laminate sheet as a test specimen and subjected to the peeling test in the same manner as in Example 1. The thus measured adhesive strengths were 4.0 N/25 mm at 0° C., 7.1 N/25 mm at 20° C., 18.6 N/25 mm at 40° C. and 32.8 N/25 mm at 60° C.

The results are collectively given in Table 2.

Example 8

A hot-melt adhesive composition and a laminate sheet were produced and a peeling test conducted in the same manner as in Example 7, except that aromatic hydrocarbon resin (trade name: FTR 6100, produced by Mitsui Chemical Industries, Ltd.) was used in place of the C9 hydrogenated petroleum resin. The thus measured adhesive strengths were 5.7 N/25 mm at 0° C., 9.8 N/25 mm at 20° C., 26.3 N/25 mm at 40° C. and 34.0 N/25 mm at 60° C.

The results are collectively given in Table 2.

Comparative Example 3

A hot-melt adhesive composition and a laminate sheet were produced and a peeling test conducted in the same manner as in Example 7, except that hydrogenated styrene/butadiene/styrene triblock copolymer (trade name: Kraton G1657, produced by Shell Chem. Co., Ltd.) was used in place of the copolymer ESC-5 obtained in Production Example 5. The thus measured adhesive strengths were 5.3 N/25 mm at 0° C., 12.3 N/25 mm at 20° C., 10.4 N/25 mm at 40° C. and 9.7 N/25 mm at 60° C.

The results are collectively given in Table 2.

Comparative Example 4

A hot-melt adhesive composition and a laminate sheet were produced and a peeling test conducted in the same manner as in Example 8, except that hydrogenated styrene/butadiene/styrene triblock copolymer (trade name: Kraton G1657, produced by Shell Chem. Co., Ltd.) was used in place of the copolymer ESC-5 obtained in Production Example 5. The thus measured adhesive strengths were 2.7 N/25 mm at 0° C., 4.6 N/25 mm at 20° C., 5.6 N/25 mm at 40° C. and 2.6 N/25 mm at 60° C. The results are collectively given in Table 2.

TABLE 2

| | Formulation of hot melt adhesive composition (g) | | Adhesive strength (unit of N/25 mm) | | | |
|---|---|---|---|---|---|---|
| | | | 0° C. | 20° C. | 40° C. | 60° C. |
| Ex. 7 | C9 hydrogenated petroleum resin | 80 | 4.0 | 7.1 | 18.6 | 32.8 |
| | ESC-5 | 40 | | | | |
| Ex. 8 | Aromatic hydrocarbon resin | 80 | 5.7 | 9.8 | 26.3 | 34.0 |
| | ESC-5 | 40 | | | | |
| Com. Ex. 3 | C9 hydrogenated petroleum resin | 80 | 5.3 | 12.3 | 10.4 | 9.7 |
| | Hydrogenated styrene/butadiene/styrene triblock copolymer | 40 | | | | |
| Com. Ex. 4 | Aromatic hydrocarbon resin | 80 | 2.7 | 4.6 | 5.6 | 2.6 |
| | Hydrogenated styrene/butadiene/styrene triblock copolymer | 40 | | | | |

What is claimed is:

1. A hot melt adhesive composition comprising:
   100 parts by weight of tackifier (B), and
   1 to 900 parts by weight of ethylene/α-olefin/aromatic vinyl compound random copolymer (C), wherein in random copolymer (C), the α-olefin has from 3 to 20 carbon atoms, and the molar ratio of structural units derived from ethylene to structural units derived from α-olefin having 3 or more carbon atoms (ethylene/α-olefin) is in the range of from 100/0 to 40/60.

2. A hot melt adhesive composition comprising:
   100 parts by weight of base polymer (A),
   1 to 900 parts by weight of tackifier (B), and
   1 to 1000 parts by weight of ethylene/α-olefin/aromatic vinyl compound random copolymer (C), wherein, in random copolymer (C), the α-olefin has from 3 to 20 carbon atoms, and the molar ratio of structural units derived from ethylene to structural units derived from α-olefin having 3 or more carbon atoms (ethylene/α-olefin) is in the range of from 100/0 to 40/60.

3. A hot melt adhesive composition comprising:
   100 parts by weight of base polymer (A),
   10 to 300 parts by weight of tackifier (B), and
   10 to 400 parts by weight of ethylene/α-olefin/aromatic vinyl compound random copolymer (C), wherein in random copolymer (C), the α-olefin has from 3 to 20 carbon atoms, and the molar ratio of structural units derived from ethylene to structural units derived from α-olefin having 3 or more carbon atoms (ethylene/α-olefin) is in the range of from 100/0 to 40/60.

4. The hot-melt adhesive composition as claimed in claim 2 or 3, wherein the base polymer (A) is at least one polymer selected from the group consisting of a polyolefin (a-1), a polar group containing polymer (a-2) and an aromatic vinyl compound/conjugated diene copolymer (a-3).

5. The hot-melt adhesive composition as claimed in claim 2 or 3, wherein the base polymer (A) is an aromatic vinyl compound/conjugated diene copolymer (a-3).

6. The hot-melt adhesive composition as claimed in any of claims 1 to 3, wherein the ethylene α-olefin/aromatic vinyl compound random copolymer (C) contains structural units derived from an aromatic vinyl compound in an amount of 1 to 80 mol %.

7. The hot-melt adhesive composition as claimed in any of claims 2 or 3, which further comprises a low-molecular-weight polyolefin having an intrinsic viscosity (η) of 0.01 to 0.6 dl/g (D) in an amount of 1 to 100 parts by weight per 100 parts by weight of the base polymer (A).

8. The hot-melt adhesive composition as claimed in claim 1 which further comprises a low-molecular weight polyolefin having an intrinsic viscosity (η) of 0.01 to 0.6 dl/g (D) in an amount of 1 to 100 parts by weight per 100 parts by weight of the tackifier (B).

9. The hot-melt adhesive composition as claimed in claim 8, wherein the ethylene/α-olefin/aromatic vinyl copolymer (C) contains structural units derived from aromatic vinyl compound in an amount of 1 to 80 mol %.

10. The hot-melt adhesive composition as claimed in claim 1, 2 or 3, wherein in random copolymer (C) the molar ratio of structural units derived from ethylene to structural units derived from α-olefin having 3 or more carbon atoms (ethylene/α-olefin) is within the range of from 100/0 to 60/40.

11. The hot-melt adhesive composition as claimed in claim 1, 2 or 3, wherein in random copolymer (C) the molar ratio of structural units derived from ethylene to structural units derived from α-olefin having 3 or more carbon atoms (ethylene/α-olefin) is within the range of from 100/0 to 70/30.

12. The hot-melt adhesive composition as claimed in claim 1, 2 or 3, wherein the random copolymer (C) comprises ethylene/styrene random copolymer.

13. The hot-melt adhesive composition as claimed in claim 1, 2 or 3, wherein the random copolymer (C) comprises ethylene/butylene/styrene random copolymer.

* * * * *